United States Patent
Wheeler

(10) Patent No.: US 9,313,151 B1
(45) Date of Patent: Apr. 12, 2016

(54) DETERMINING USER INFORMATION FROM AUTOMATED REPLIES

(71) Applicant: Amazon Technologies, Inc., Reno, NV (US)

(72) Inventor: Christopher Alan Wheeler, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 311 days.

(21) Appl. No.: 13/762,540

(22) Filed: Feb. 8, 2013

(51) Int. Cl.
*H04L 12/58* (2006.01)
*G06F 12/14* (2006.01)
*G06F 17/00* (2006.01)
*G06F 15/16* (2006.01)

(52) U.S. Cl.
CPC .............. *H04L 51/02* (2013.01); *G06F 12/14* (2013.01); *G06F 15/16* (2013.01); *G06F 17/60* (2013.01)

(58) Field of Classification Search
CPC ................................ G06F 15/16; G06Q 10/00
USPC ........................................... 709/206, 204, 26
See application file for complete search history.

(56) References Cited

U.S. PATENT DOCUMENTS

| | | | |
|---|---|---|---|
| 8,073,785 B1* | 12/2011 | Candella et al. ................. 705/75 |
| 2005/0038715 A1* | 2/2005 | Sines et al. ....................... 705/26 |
| 2005/0132006 A1* | 6/2005 | Horvitz et al. ................. 709/204 |
| 2007/0192418 A1* | 8/2007 | Adams et al. .................. 709/206 |
| 2009/0235280 A1* | 9/2009 | Tannier et al. .................. 719/318 |
| 2010/0146059 A1* | 6/2010 | DellaFera et al. ............. 709/206 |
| 2010/0153184 A1* | 6/2010 | Caffrey et al. ................... 705/10 |
| 2011/0269439 A1* | 11/2011 | Griffin .......................... 455/415 |
| 2011/0302251 A1* | 12/2011 | Meunier et al. ............... 709/206 |
| 2012/0226707 A1* | 9/2012 | Brun et al. ..................... 707/769 |

FOREIGN PATENT DOCUMENTS

WO  WO2011054710  * 5/2011 ............. G06Q 10/00

* cited by examiner

*Primary Examiner* — Nicholas Taylor
*Assistant Examiner* — Sanjoy Roy
(74) *Attorney, Agent, or Firm* — Athorus, PLLC

(57) ABSTRACT

Automated reply messages such as "out-of-office" messages or "away" messages are messages that have been programmed for delivery on behalf of a user upon the receipt of another message intended for the user. An automated reply message typically includes relevant information regarding the user, such as supplemental contact information for the user, a duration of his or her unavailability, and an agent or other contact who may be reached on his or her behalf while he or she is unavailable. The information contained therein may be harvested and utilized for any means, including to protect the user against fraudulent attempted actions on his or her behalf that are not authorized by the user or an agent identified in the reply message.

26 Claims, 11 Drawing Sheets

300

312 — From: Julie Brown <julie.brown@acmecpas.com>
314 — Date: Tuesday, October 23, 2007 1:45 PM ET
316 — To: Online Marketplace <deals@onlinemarketplace.com>
318 — Subject: Out of Office: Updated CPA Training for 2008 - CD, DVD, VHS 324    326    322

I will be celebrating my honeymoon in Hawaii until Monday, November 5, with limited access to E-mail. I may be reached by cell phone at (718) 555-5114. Happy Easter!

328    332

320

If this is an urgent matter, please contact my assistant, Karen DiFiore, by E-mail at karen.difiore@acmecpas.com or (212) 555-0034.

336    334

Thank you very much for your E-mail.

310

330

Julie Brown, CPA
Acme Accountants
200 East 82nd Street - Suite 275
350 — New York, NY  10028
Phone: (212) 555-7466
Fax: (212) 555-0329
E-mail: julie.brown@acmecpas.com

---

From: Online Marketplace <deals@onlinemarketplace.com>
Date: Tuesday, October 23, 2007 12:40 PM CT
To: Julie Brown <julie.brown@acmecpas.com>
Subject: Updated CPA Training for 2008 - CD, DVD, VHS

360

The Sarbanes-Oxley Act (SOX) continues to bedevil firms large and small, and has prompted many international companies to seek refuge in foreign jurisdictions. Find out how you can protect your clients and help them stay in the United States, with our new continuing education series.

Now available in an audio CD or in video on DVD or VHS. All titles include an electronic guide in PDF format.

Click here for more information. Click here to unsubscribe.

FIG. 3

From: Robert Ricks <robert.ricks@bankntrust.com> — 512B
Date: Tuesday, May 11, 2010 11:30 AM ET — 514B
To: Online Marketplace <deals@onlinemarketplace.com> — 516B
Subject: Out of Office: New Office Furniture Deals for 2010 — 518B I am out of the office with occasional access to E-mail, but will return tanned, rested and ready on Monday, May 17, 2010.

If this is an urgent matter, I may be reached via telephone through the front desk at The Grand Cayman Resort, West Bay Road, Cayman Islands, at +1 345-943-9000.

Please direct all trading orders to my colleague, Tara Lindsay, at (617) 555-0108, or via E-mail at tara.lindsay@bankntrust.com, until my return. Please note that we cannot process orders to buy or sell any securities via E-mail.

Thank you!

FIG. 5B

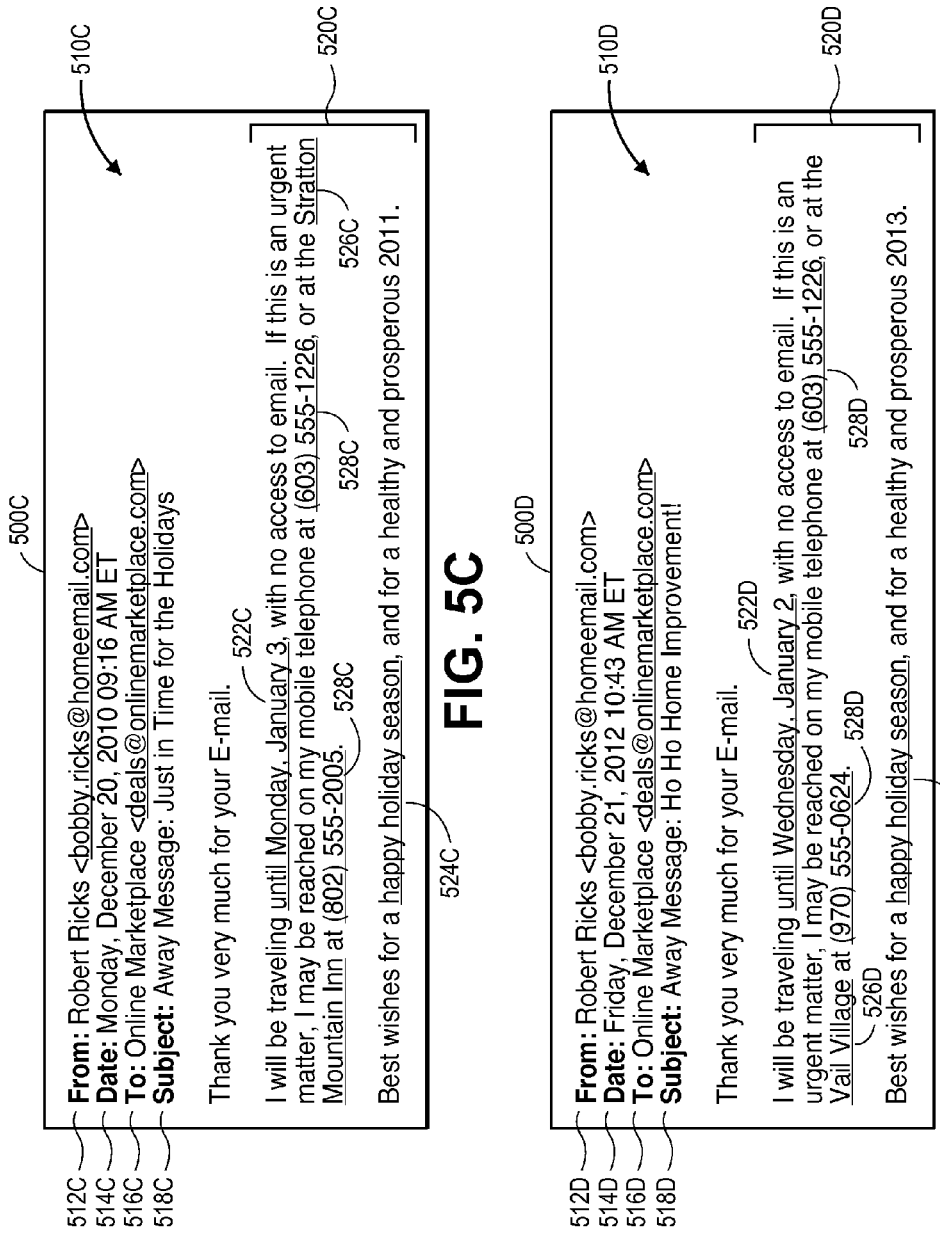

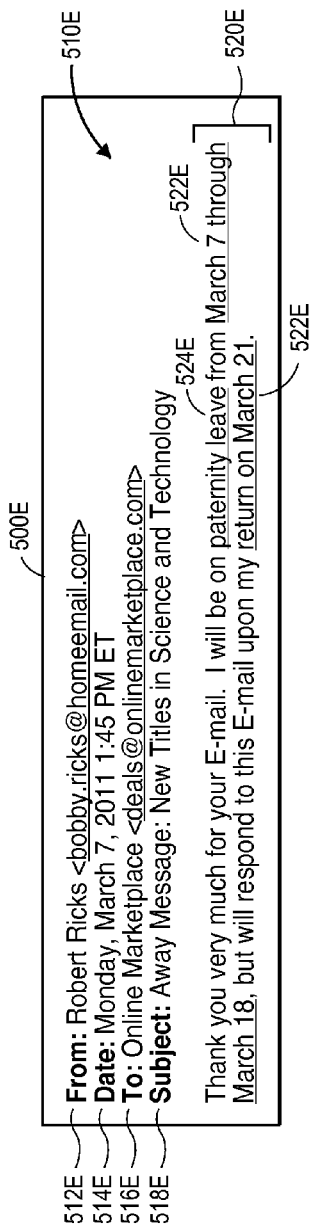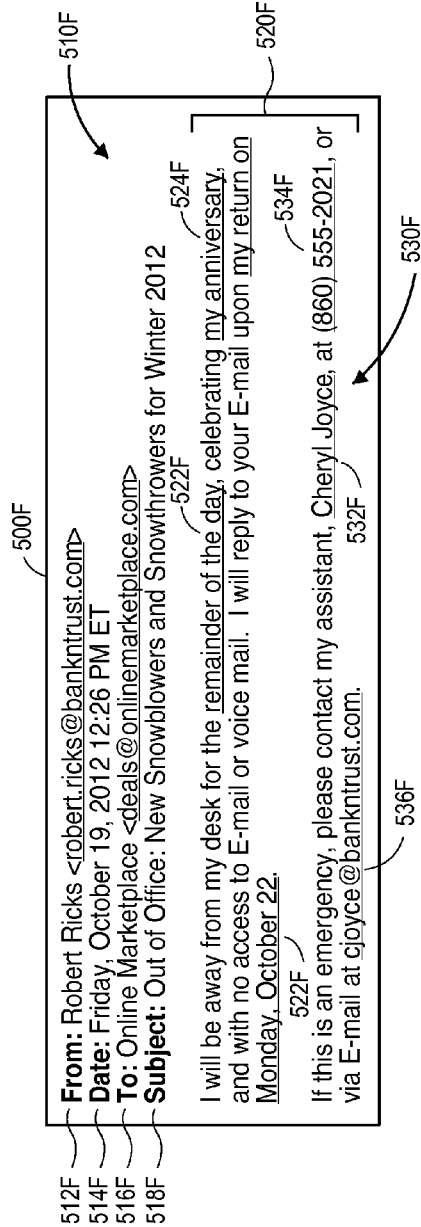

DETERMINING USER INFORMATION FROM AUTOMATED REPLIES

BACKGROUND

Frequently, when a user of an electronic messaging service (such as electronic mail, or E-mail) recognizes that he or she will be unable to respond to any received electronic messages, or will have limited access to such electronic messages, the user may prepare an automated reply message (sometimes called an "out-of-office message" or an "away message") to be automatically transmitted to a sender of an electronic message to the user. Settings for preparing and automatically transmitting the reply message may be established on a computer through which the user accesses his or her electronic messages, or through an Internet Service Provider (or "ISP") or other service provider by way of which the user receives the electronic messages.

Automated reply messages can include any information that may be designated at the discretion of the user, and typically contain a statement or message from the user, an explanation for his or her absence or unavailability, an indication as to when he or she will be fully capable of receiving or transmitting such messages in the future, and a way in which he or she may be reached either directly or through a designated agent. Users may create automated replies to be transmitted on one-time bases, or at regular intervals or time periods, and specific automated replies may be designated for transmission to specific senders of messages (e.g., one automated reply may be created for transmission to senders within the user's network, while another automated reply may be created for transmission to senders outside of the user's network).

Therefore, an automated reply, and a user's patterns in establishing and causing the sending of automated replies, may contain a significant amount of information regarding the user. For example, when considered in the aggregate, automated replies may provide an indication of a user's personal or professional tendencies, including when the user is available for electronic communications, where the user may prefer to travel, and alternate contact information at which the user may be reached, as well as the identities of trusted resources or agents whom the user may authorize to communicate or act on his or her behalf. Once an automated reply is transmitted to a sender of an electronic message from a computer, a server, a service provider or another designated source, the automated reply is typically read by the individual sender and discarded.

BRIEF DESCRIPTION OF THE DRAWINGS

FIG. 3 is one example of an automated reply, in accordance with embodiments of the present disclosure.

FIGS. 5B-5G are examples of automated replies, in accordance with embodiments of the present disclosure.

DETAILED DESCRIPTION

Figure 1:
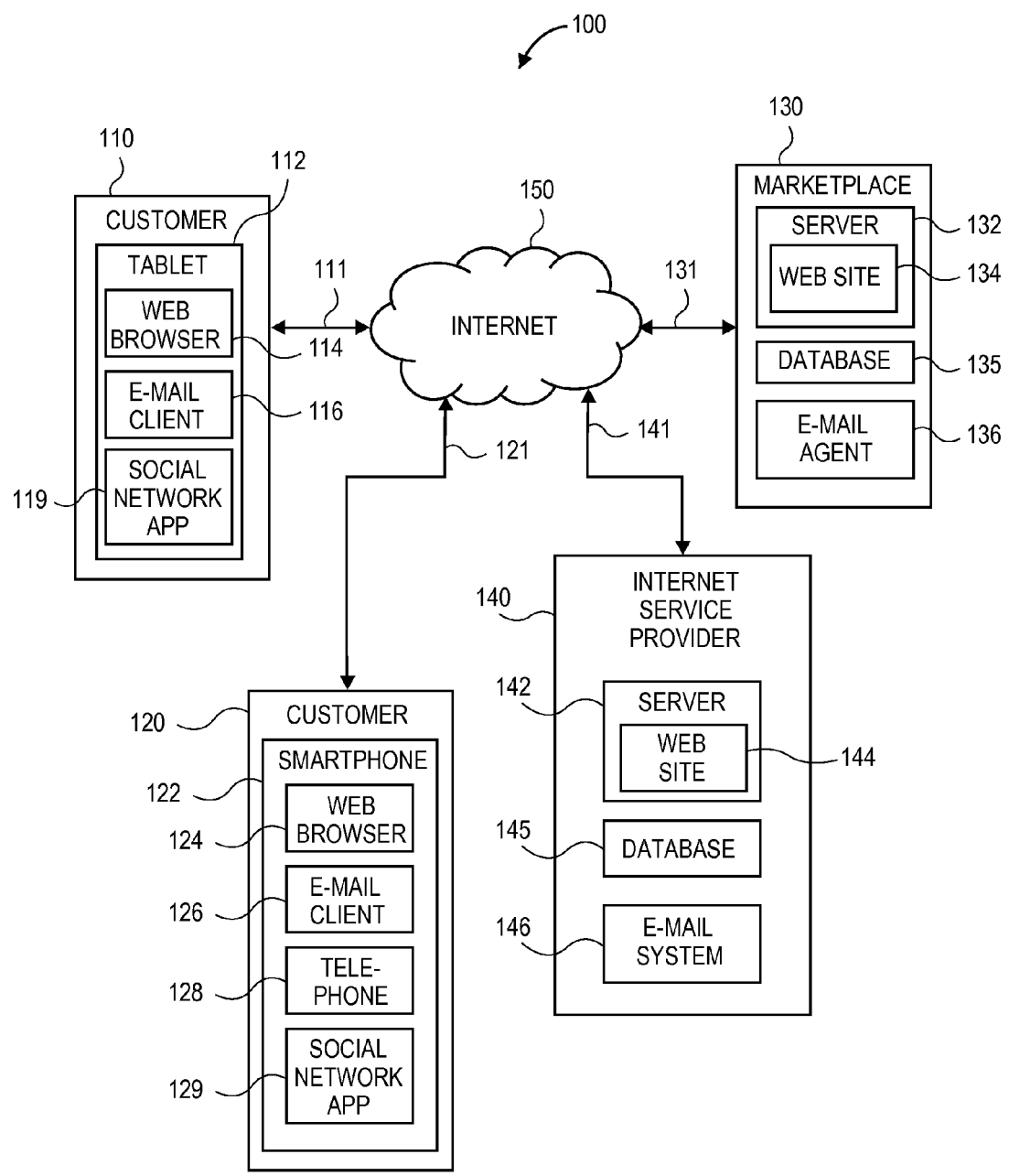
FIG. 1 is a block diagram of one example of a system for determining user information from automated replies, in accordance with embodiments of the present disclosure.

As is set forth in greater detail below, the present disclosure is directed to systems and methods for harvesting information regarding a user (or customer) from one or more automated replies that have been transmitted by or on behalf of the user. Specifically, the systems and methods disclosed herein may identify, cull and/or deduce information from automated reply messages, such as "out-of-office" replies or "away" messages, including the content of such messages, the timing of such messages, any patterns in the establishment or creation of such messages, as well as any secondary contact information for the user that may be included in such messages and the identities of any personnel or agents listed therein, who may be authorized to act on the user's behalf, or may be aware of the user's whereabouts and/or availability.

An automated reply message, or multiple automated reply messages, may provide a significant amount of information regarding the user that caused the message or messages to be sent. For example, the automated reply message may identify an intended duration of the user's unavailability, a reason for the user's unavailability, a location where the user may be located when he or she is unavailable, as well as any secondary contact information for the sender. Additionally, the automated reply message may identify one or more authorized agents who may be empowered to act on his or her behalf while he or she is unavailable.

The information included in one or more automated reply messages may be utilized by a recipient thereof in any number of ways, and the following examples of applications of the systems and methods of the present disclosure are not exclusive. First, upon the receipt of an automated reply message from or on behalf of a user that identifies a duration of the user's unavailability or a designated agent who is authorized to act on the user's behalf, a sender of a message that prompted the delivery of the automated reply message may suspend the delivery of messages to the user for the duration of the user's unavailability, or route such messages to the user's designated agent. Second, a sender of a message that prompted the delivery of an automated reply message may offer to collect any messages that would have been sent to a user during the duration of the user's unavailability, and to deliver such messages to the user in bulk when the user is available to receive and review them. Optionally, any messages that may have been irrelevant or obsolete by the user's unavailability may be removed from the bulk delivery.

Third, when a plurality of one or more automated reply messages has been received by or on behalf of a user, one or more mathematical models may be applied to the messages and/or any metadata associated therewith, to determine whether any patterns of the user's availability may be identified. For example, where a user has caused automated reply messages to be delivered to senders who delivered messages to the user during regular or common periods in the summer months (e.g., the third week of June) each year, it may be logically inferred that the user will also be unavailable during that period in the coming years (i.e., that the user regularly plans vacations during the third week of June). Where the user causes automated reply messages to be delivered that indicate his or her unavailability for a short period of time on a specific date of each week (e.g., Friday mornings), it may be logically inferred that the user will also be unavailable during that period in the coming weeks (e.g., that the user regularly plans exercise or other personal activities for Friday mornings each week). Moreover, where an automated reply message includes any amount or type of metadata, such as data that may be included in one or more custom or non-standard headers (i.e., X-headers).

Fourth, where an online marketplace or other commercial entity delivers a message to a user and receives an automated reply message in response, the receipt of the automated reply message by the online marketplace may aid in protecting against acts of fraud against the user. For example, where an automated reply message identifies secondary contact information for a user (including a current or temporary location for the user), or designates the user's agent, an online marketplace receives a surreptitiously placed order for a purchase of an item on behalf of the user from a third party, the online marketplace may decline to process the order if the third party is not the user's designated agent, or if the order requests that the item be delivered to a destination that is inconsistent with either the user's primary location, or the user's current or temporary location, the online marketplace may suspend the order or decline to process it.

Fifth, information regarding a user's whereabouts and/or availability that is contained in an automated reply message received by or on behalf of a user may be aggregated with information regarding other users' whereabouts and/or availability and used to derive macroscopic data as to when users are generally available or unavailable, and where such users may be located during periods of availability or unavailability. For example, where an online marketplace transmits one or more marketing E-mails to a group of users, any automated reply E-mails received from some or all of the users may be analyzed to identify which users are available and which are not, and where such users may be located. Such information may be processed and incorporated into the planning and/or delivery of messages in the future.

Sixth, any secondary contact information that may be included in an automated reply message that is received from a user (i.e., the user's current or temporary locations, telephone numbers or electronic mail addresses) may be identified and stored in a profile for the user. For example, where a profile of a customer that is maintained by an online marketplace includes the customer's home address, home telephone number and/or work E-mail address, and an out-of-office E-mail received by or on behalf of the customer includes a temporary address, mobile telephone number and/or personal E-mail address for the customer, such information may be recognized by the systems and methods disclosed herein and incorporated into the profile of the customer. Where an automated reply message that includes such secondary contact information is received by a sender of a message to a user, the sender may deliver messages or information of an urgent nature to the user (e.g., messages notifying the user of a pending threat to public safety or weather occurrence) by way of the location, telephone number, E-mail address or other identifier that may be listed in the secondary contact information. For example, where a utility delivers an E-mail message regarding a pending bill to an E-mail address that is on file for a utility customer, and an automated reply message including a mobile telephone number for the user is received in response, the utility may call the customer at the mobile telephone number or deliver one or more text messages, e.g., such as short or multimedia messaging service (SMS or MMS) messages, to the user regarding the pending bill.

Accordingly, the systems and methods of the present disclosure may be utilized to gather, process and utilize any information regarding a user that may be included in one or more automated reply messages (e.g., E-mails, SMS text messages or MMS text messages, or messages received by or through a social network) that have been delivered by or on behalf of the user in response to a delivery of another like message to the user for a variety of purposes.

The sending and receiving of electronic messages have changed the way that people communicate with one another. The most common electronic message, electronic mail, or E-mail, comprises a set of text that may be generated at one application operating on a machine on behalf of the sender of the E-mail (sometimes called a "mail user agent" or an "E-mail client"), transmitted to another machine or apparatus (e.g., an "E-mail server") that may be implicitly or explicitly designated by the sender and may be operating one or more mail processing programs or applications (sometimes called a "mail submission agent"). Once an E-mail has been received by an E-mail server, i.e., a mail submission agent, the E-mail may be transferred to another E-mail server (sometimes called a "mail transmission agent"), before being routed to yet another E-mail server (a "mail delivery agent") that may be implicitly or explicitly designated by a recipient, and then transferred to an application operating on a machine on behalf of the recipient (e.g., an E-mail client or mail user agent). Some common E-mail clients include applications that run on free-standing machines, such as Microsoft® Outlook®, Microsoft® Entourage®, Apple® Mail, or web sites or web applications that provide E-mail access on any machine through the Internet, such as Gmail® or Yahoo!®.

In the delivery and receipt of an E-mail message, a first E-mail client may deliver a message generated by or on behalf of a sender to a first E-mail server designated by the sender, and the first E-mail server may then transmit the message to a second E-mail server identified in an E-mail address of a recipient. The second E-mail client may then request that the second E-mail server deliver the message on behalf of the recipient, and delete any copies therefrom. The second E-mail client may then divide the set of text included in the message into different parts (e.g., identifiers of the sender, the recipient, a subject of the message and a date on which the message was sent, as well as a body of the message), and display tags or indicators of the message and other messages, sorted in a list. Traditionally, outgoing E-mail messages are handled by a server operating according to the SMTP protocol (or "Simple Mail Transfer Protocol"), while incoming E-mail messages are handled by a server operating according to either the POP3 protocol ("Post Office Protocol") or the IMAP protocol ("Internet Mail Access Protocol"). Such servers may be maintained or operated by Internet Service Providers ("ISP"), web-hosting services or any other entities.

Typically, a user may create an automated reply message through a client application such as an E-mail client, i.e., through a free-standing application operating on a specific computer machine or through a web-based client accessible through a browser operating on any computer machine. The content of the automated reply message, which may include text and/or one or more other graphical features or aspects, may be defined by the user at the E-mail client and stored with one or more agents, such that the automated reply message is transmitted automatically to a sender of an electronic message intended for the user upon an agent's receipt or identification thereof. For example, a user may create an "out-of-office" message at an E-mail client at which he or she accesses his or her E-mail account, and the "out-of-office" message may be transferred to an E-mail agent, such as a mail transmission agent. When the mail transmission agent receives an E-mail from a mail submission agent that is intended for the user, the mail transmission agent may deliver the "out-of-office" message to the sender of the message. Most clients permit a user to set any number of parameters when establishing an automated reply message, such as a date and a time when the delivery of automated reply messages should end, which may define the duration of his or her unavailability, as well as any specific recipients or groups of recipients that should or should not receive the automated reply (e.g., whitelists or blacklists). Furthermore, when an automated reply message has been established by a user, and has been set to expire at a certain time, the user may elect to cancel the automated reply message at any time, such as in the event that he or she actually returns from the period of unavailability earlier than he or she intended.

Once an automated reply message is received, any information contained therein may be interpreted, processed and/or stored by one or more of the systems and methods of the present disclosure, and sorted by any further aspect or indexable feature thereof. For example, an automated reply message may be analyzed to identify any type of information regarding a sender of the automated reply message (i.e., a recipient of an originating electronic message), including the sender's primary and secondary contact information, an identity or contact information of any agent designated to act on behalf of the sender, any length or duration of the sender's unavailability, a location of the sender during his or her unavailability, a reason or cause of the sender's unavailability, and/or any metadata included with the message, such as a custom header or X-header, which may include any information associated with the routing or delivery of the message.

The systems and methods disclosed herein may be trained to identify features of contact information within an automated reply message, such as telephone numbers (which may include a country code preceded by a + or "plus" symbol, an area code having a recognizable set of three digits and/or a hyphen or period), E-mail addresses (which usually include an @, or "at" symbol, and one or more periods), physical addresses (which usually include a recognizable geographic name such as a town, a city, a county, a township, a state, a province, a country or a continent, as well as one or more unique identifiers such as a Zoning Improvement Plan code, or ZIP code), as well as names of people. The systems and methods disclosed herein may also be trained to identify specific associated adjectives, verbs or nouns within the content of an automated reply message (e.g., "sunny" may imply a favorable weather pattern or a vacation, while "honeymoon," "birthday" or "anniversary" may imply a repeated event of annual significance), and to associate such attitudes, verbs or nouns, as well as any implied adjectives, adverbs or nouns, with the user that generated the automated reply message, or caused the automated reply message to be transmitted. Moreover, the systems and methods disclosed herein may be trained to identify features or aspects of electronic messages that are consistent with social networks, including hashtags (which may include a #, or a "number sign") or social network login names, screen names or handles (which may include an @, or "at" symbol, or a +, or "plus" symbol), as well as various associated phrases including but not limited to "follow me," "friend me," "IM me," "like me," or the like, which imply or refer to an electronic message or communication to be provided through a social network.

Those of ordinary skill in the pertinent art would recognize that the systems and methods disclosed herein are not limited to automated reply messages that are delivered and received in the form of E-mail. For example, automated reply messages that may be transmitted and received as SMS or MMS text messages, or through one or more independent messaging services or systems operating on any platform (e.g., a social network), may also be analyzed and interpreted in accordance with the systems and methods disclosed herein.

Moreover, information that is included in an automated reply message may be stored, analyzed, plotted, tracked, modeled, interpreted and/or associated with the sender of the automated reply message according to one or more mathematical models or formulas, for any reason and on any basis. Those of ordinary skill in the art would recognize that any form of mathematical calculations or modeling may be utilized to identify, evaluate or analyze information included in an automated reply message, in accordance with the systems and methods of the present disclosure. Moreover, the one or more calculations, modeling, identification, evaluation and analysis thereof need not occur in real-time or in near-real time, as any information included therein. For example, the various factors regarding prior preparations and shipments of items may be evaluated offline, and called upon once a need for such information is identified.

Referring to FIG. 1, one system 100 for determining user information from automated replies is shown. The system 100 includes customers 110, 120 an online marketplace 130 and an Internet Service Provider (or "ISP") 140 that are connected to one another across a network 140, such as the Internet. The customers 110, 120 may be any entities or individuals that wish to download, purchase, rent, lease, borrow or otherwise obtain items (which may include goods, products, services or information of any type or form) from the marketplace 130. The customers 110, 120 may utilize one or more computing devices, such as a tablet computer 112 or a smartphone 122, or any other like machine that may operate or access one or more software applications, such as a web browser 114, 124, an E-mail client 116, 126, a social network application 119, 129. The customers 110, 120 may also utilize a telephone or telephonic device, such as the telephone 128. The tablet computer 112, the smartphone 122 or the other like machines utilized by the customers 110, 120 may be connected to or otherwise communicate with the marketplace 130 or the Internet Service Provider 140 through the network 140, as indicated by lines 111, 121, by the transmission and receipt of digital data.

The marketplace 130 may be any entity or individual that wishes to make items from a variety of sources available for download, purchase, rent, lease or borrowing by customers through the use of at least one web site or web page 134 maintained using a networked computer infrastructure, including one or more physical computer servers 132 and a database 135. The marketplace 130 may also maintain an E-mail agent 136 that may direct or control the delivery and receipt of E-mails from and to the marketplace 130. The web site 134 may be implemented using the server 132, which connect or otherwise communicate with the network 140, as indicated by line 131, through the sending and receiving of digital data. In addition, items that are made available at the marketplace 130 or ordered therefrom by customers may be made by or obtained from one or more third party sources, such as sellers, vendors or manufacturers (not shown), or from any other source. Moreover, the marketplace 130 itself may be a seller, a vendor or a manufacturer.

The Internet Service Provider 140 may be any entity or organization that provides or orchestrates access to a network 140, such as the Internet, for entities, organizations or individuals such as the customers 110, 120 or the marketplace 130. The Internet Service Provider 140 may operate a networked computer infrastructure, including one or more physical computer servers 142 and a database 145, and may also maintain an E-mail system 146 that may operate one or more agents for directing or controlling the delivery and receipt of E-mails from and to clients thereof, which may include the customers 110, 120 and/or the marketplace 130. Such infrastructure and the components thereof or applications operating thereon may provide access, transfer mail, host web pages, peer with other Internet Service Providers, or perform any other Internet-related function, and may take any real or virtual form. The Internet Service Provider 140 may further maintain a web site 144 using the server 142, which connects or otherwise communicates with the network 140, as indicated by line 141, through the sending and receiving of digital data. In addition, any pertinent information The customers 110, 120, the marketplace 130 and the Internet Service Provider 140 may operate one or more order processing and/or communication systems which may be implemented through one or more computing machines that may be connected to the Internet 140, in order to transmit information in the form of digital or analog data regarding one or more items to be made available to customers at the marketplace 130, or purchased by the customers 110, 120 from the marketplace 130, or for any other purpose. For example, the customers 110, 120 may communicate with the marketplace 130 or any third party by electronic mail via the E-mail clients 116, 126 or through one or more interfaces provided by web browsers 114, 124, which may operate on a tablet computer 112 or a smartphone 122 that is connected to the Internet 140, as is indicated by lines 111, 121. Similarly, the marketplace 130 may communicate with the customers 110, 120 or any third party by electronic mail via the E-mail agent 136 or through one or more interfaces provided through the server 132 or by the web site 134, as is indicated by line 131. Moreover, messaging between numerous E-mail clients or agents, including the E-mail clients 116, 126 maintained by the customers 110, 120 or the E-mail agent 136 maintained by the marketplace 130, may be transferred, routed, handled, stored or processed by the Internet Service Provider 140.

Those of skill in the pertinent art will recognize that the customers 110, 120 and the marketplace 130 may use a keyboard, keypad, mouse, stylus, touch screen, or other device (not shown) or method for interacting with the tablet computer 112, the smartphone 122, the web browsers 114, 124, the E-mail clients 116, 126, and/or the social networking applications 119, 129; the server 132, the web site 134, the database 135 and/or the E-mail agent 136; or to "select" an item, link, node, hub or any other aspect of the present disclosure. Those of skill in the pertinent art will also recognize that the computers, servers, devices and the like described herein have the necessary electronics, software, memory, storage, databases, firmware, logic/state machines, microprocessors, communication links, displays or other visual or audio user interfaces, printing devices, and any other input/output interfaces to perform the functions described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Where the term "agent" is used herein to refer to a person (e.g., an individual other than a user who caused an automated reply message to be transmitted, and is identified in the automated reply message), those of ordinary skill in the art would recognize that the term carries a standard definition that is understood in the field of principal-agency law, namely, an individual who is authorized to act for and under the direction of another person (viz., a principal, or the user who caused the automated reply message to be transmitted) when dealing with third parties. Where the term "agent" is used herein to refer to a computer-related application, component or server, those of ordinary skill in the art would recognize that the term carries a standard definition that is understood in the fields of electronic communication and messaging, namely, a program or component that performs a specific, defined information-gathering or processing task.

The customers 110, 120, the marketplace 130 and the Internet Service Provider 140 may use any web-enabled or Internet applications or features, such as the web browsers 114, 124, the E-mail agents 116, 126, the telephone 128, the social networking applications 119, 129, the web site 134, the E-mail agent 136, the web site 144 or the E-mail system 146, or any other client-server applications or features such as electronic mail (or E-mail), or other messaging techniques, to connect to the Internet 140 or to communicate with one another, including short or multimedia messaging service (SMS or MMS) text messages or any other form of electronic message. In addition, the tablet computer 112, the smartphone 122, the server 132 and the server 142 may include any of a number of computing devices that are capable of communicating over the network, including but not limited to set-top boxes, personal digital assistants, mobile phones including "smartphones," digital media players, web pads, tablet computers, laptop computers, desktop computers, electronic book readers, and the like. The protocols and components for providing communication between the tablet computer 112, the smartphone 122, the server 132 and/or the server 142 are well known to those skilled in the art of computer communications and thus, need not be described in more detail herein.

The data and/or computer executable instructions, programs, firmware, software and the like (also referred to herein as "computer executable" components) described herein may be stored on a computer-readable medium that is within or accessible by the tablet computer 112, the smartphone 122, the server 132 and/or the server 142, and having sequences of instructions which, when executed by a processor (such as a central processing unit, or CPU), cause the processor to perform all or a portion of the functions and/or methods described herein. Such computer executable instructions, programs, software and the like may be loaded into the memory of the tablet computer 112, the smartphone 122, the server 132 or the server 142 using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), erasable programmable read-only memories (EPROMs), electrically erasable programmable read-only memories (EEPROMs), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

For the purposes of illustration, some of the systems and methods disclosed herein may be referenced primarily in the context of a marketplace that transmits electronic messages (e.g., messages of a commercial nature) to customers who may wish to download, purchase, rent, lease or borrow items over the Internet, and may receive an automated reply message from one or more of such customers, such as is shown in FIG. 1. As will be recognized by those of skill in the art, however, the systems and methods disclosed herein may also be used in many other situations in which automated reply messages are transmitted and received, and their utility is not limited to any of the preferred embodiments described herein.

Figure 2:
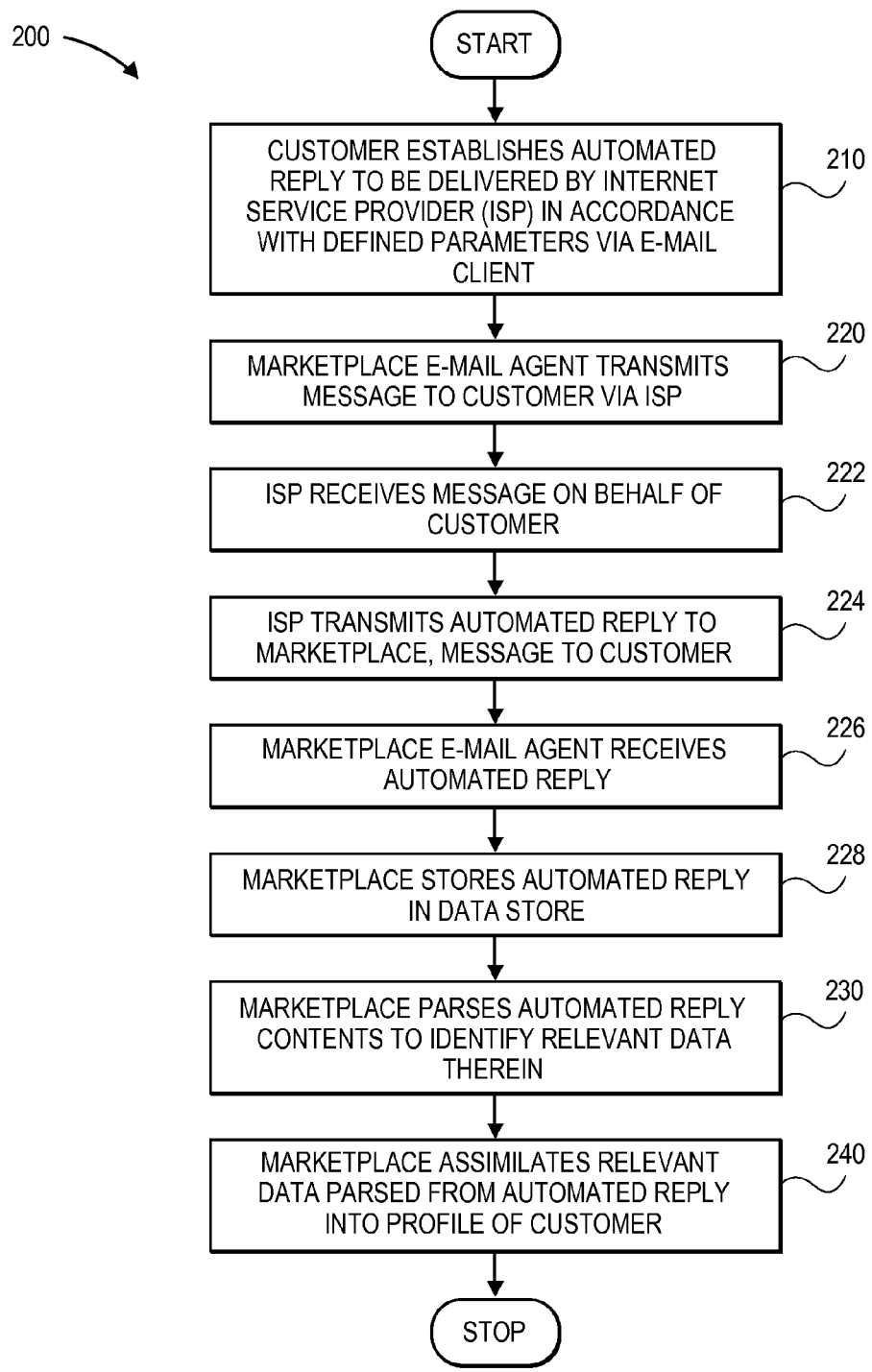
FIG. 2 is a flow chart of one example of a process for determining user information from automated replies, in accordance with embodiments of the present disclosure.

As is discussed above, the systems and methods of the present disclosure may be utilized to analyze the contents of an automated reply message received from a user (or customer), to identify any pertinent information contained therein, and to associate any such pertinent information with the customer. Referring to FIG. 2, a flow chart 200 representing one embodiment of a process for determining user information from automated replies is shown. At step 210, a customer establishes an automated reply message that is to be delivered by an Internet Service Provider to senders who transmit E-mails to the customer in accordance with one or more defined parameters (e.g., dates and times during which the automated reply messages should be sent), at an E-mail client. For example, the customer access an application or web site operating an E-mail client, enter text to be included in such an automated reply, and enter one or more settings regarding the delivery of such replies. The text to be included in the automated reply may include a duration of the customer's unavailability, a location or area where the customer will be located during this time, an indicator as to what the customer will be doing while he or she is unavailable, any secondary contact information for the customer (e.g., an alternate address, telephone number or E-mail address), as well as a name of one or more designated agents who may act on behalf of the customer until he or she becomes available again. The text of the automated reply message and any of the defined parameters may be entered at the E-mail client, such as the E-mail clients 116, 126 shown in FIG. 1, transferred to an Internet Service Provider, and stored in an accessible data store, such as the Internet Service Provider database 135 shown in FIG. 1.

At step 220, the marketplace E-mail agent transmits a message to the customer via the Internet Service Provider, and at step 222, the Internet Service Provider receives the message on behalf of the customer. For example, a mail user agent manually or automatically operated by the marketplace may send an E-mail to an address associated with the customer through a mail transmission agent, and the mail transmission agent may send the E-mail to the Internet Service Provider. At step 224, the Internet Service Provider transmits the automated reply message established by the customer at step 210 to the marketplace, and also forwards the E-mail that was received from the marketplace to the customer.

At step 226, the marketplace E-mail agent response automated reply message on behalf of the customer, and at step 228, the marketplace stores the automated reply message in a data store. For example, the automated reply message, or the text included therein, may be associated with the customer and stored in a database, such as the marketplace database 135 shown in FIG. 1. At step 230, the marketplace parses the contents of the automated reply message in order to identify any relevant data therein. For example, the automated reply message or the text included therein may be processed or dissected to identify the date at which the message was sent by the Internet Service Provider, the subject of the message (i.e., typically including a prefix or identifier such as "Out of Office" or "Away," followed by some or all of a subject of the original E-mail that prompted the delivery of the automated reply message, such as the message sent by the marketplace at step 220), and any of the contents of the message. Such contents may be searched for keywords or other recognizable fields or features such as telephone numbers (which may include an area code and/or a hyphen or period), E-mail addresses (based on the presence of at least one @, or "at" symbol), physical addresses or other references to locations (which may include a recognizable geographic names like towns, cities, states or countries), as well as names of people. The automated reply message may further include metadata, such as hidden information that may be included in a custom header or X-header.

At step 240, the marketplace may assimilate the relevant data parsed from the automated reply message at step 230 into the profile of the customer. For example, where an automated reply message includes a secondary telephone number (e.g., a cellular phone number or other contact number), the secondary telephone number may be added to the customer profile. Where an automated reply message includes the name of an agent (e.g., a secretary or other authorized contact), the name of that contact may be added to the customer profile. Where the automated reply message indicates that the customer is traveling to a specific destination at a particular date and time or for a particular reason (e.g., a business trip to Dallas, a vacation to the Cayman Islands or an afternoon playing golf), such information may be added to the customer profile. Where the timing and/or content of the automated reply message is consistent with one or more other previously transmitted automated reply messages received from the customer (i.e., the automated reply message is indicative of a pattern of unavailability as to a location where the user is or will be located, a reason for the unavailability, or a time or duration of the unavailability), the relationship of the automated reply message to other automated reply messages may be recorded in the customer profile.

Accordingly, the systems and methods may augment the information known regarding a user based on the content of an automated reply message transmitted on his or her behalf, including not only the content of the message but also the context in which the message was sent, and any patterns, consistencies or relationships between the message and any other automated reply messages or other information known regarding the user. The information contained or implied in the content of the message may be utilized for any purpose.

For example, the systems and methods disclosed herein may identify a duration of the user's unavailability or a designated agent authorized to act on behalf of the user from the content of a reply message. Such systems and methods may further offer to suspend delivery of future messages to the user during the duration of the user's unavailability, to collect and deliver such messages to the user upon his or her return, or to route some or all of such messages to the designated agent. The systems and methods disclosed herein may further mathematically model information contained in reply messages received from the user, or from the user and from other users, to determine whether any patterns of availability may be identified for the user, or for all users in general. The content of the reply messages may also aid in fraud protection by revealing potential personnel who may be authorized to execute transactions on behalf of the user, or locations where the user may want or expect deliveries to be made. Such content may also augment contact information that may already be known regarding the user, and may be further utilized to communicate with the user.

Moreover, the systems and methods disclosed herein may also identify when a user has returned from a period of unavailability, based on a failure to receive a reply message from the user during the period of unavailability in response to a subsequent origination message. For example, where a group of users' E-mail accounts are operated through a common server or provider, and where a delivery of an origination message from one of the users to an unavailable recipient results in the receipt of an automated reply message, the automated reply message may be stored in one or more data stores associated with the server or provider, and any relevant data may be parsed from the automated reply message, including information regarding a period of unavailability of the unavailable recipient (i.e., a duration of the period of unavailability, or a date or time when the period of unavailability will terminate). Next, if another of the users sends another message to the unavailable recipient during the period of unavailability, and another automated reply message is not received, or if any of the users receives a message from the unavailable recipient, it may be determined that the unavailable recipient is no longer unavailable.

Where a plurality of automated reply messages is received from one or more users, the automated reply messages may be transmitted to a pool of human workers for analysis, including to determine a reason for a user's unavailability, a duration of the user's unavailability, or a pattern of unavailability of a group of users having at least one attribute or factor in common. For example, the pool of workers may be an external organization that employs or contracts with an electronic messaging service (such as may be associated with an online marketplace) and/or is otherwise an independent entity not associated with the service. In one embodiment, the pool of human workers may be associated with a crowdsourcing Internet site or organization, wherein each of the workers in the pool may be trained to analyze the express or implicit contents of communications received over the network. The pool of workers may be trained to identify such durations, patterns or other information based on the contents of the messages, or using information obtained from one or more external sources.

Referring to FIG. 3, one electronic mail exchange 300 that may be analyzed or considered by embodiments of the systems and methods of the present disclosure is shown. The exchange 300 includes an automated reply message 310 and an origination message 360. The automated reply message 310 identifies a sender 312, a date 314, a recipient 316 and a subject 318 of the E-mail, and further includes a body 320 of the E-mail, information 330 regarding an authorized agent of the sender 312, as well as primary contact information 350 of the sender 312. Additionally, the origination message 360 is a message that was transmitted to the sender 312 and which prompted the transmission of the automated reply message 310.

The systems and methods of the present disclosure may be utilized to identify or extract any type of information regarding the sender 312, including but not limited to information 322 regarding a duration for which the sender 312 may be unavailable, as well as information 324 regarding a reason or purpose for the unavailability (viz., a honeymoon), information 326 regarding a location of the sender 312 during her unavailability (viz., Hawaii), and information 328 regarding secondary contact information for the sender 312 (i.e., a cellular telephone number). The systems and methods of present disclosure may also be utilized to identify one or more agents who may authorized to act or respond on behalf of the sender 312. As is shown in FIG. 3, the automated reply message 310 identifies an agent 332 and includes a telephone number 334 and an E-mail address 336 of the agent 332. The automated reply message 310 further includes primary contact information 350 for the sender 312.

Accordingly, as is discussed above, embodiments of the present disclosure may identify pertinent information regarding a user based on the content of an automated reply message, such as the automated reply message 310 of FIG. 3, and may further utilize such information for any relevant purpose. For example, an online marketplace that receives the automated reply message 310 of FIG. 3 may store the fact that the sender 312 is celebrating her honeymoon in October 2007, and recognize that she is likely to celebrate her anniversary in October each year. The online marketplace may also recognize that the sender 312 enjoys traveling to warm and tropical locations, such as Hawaii. The online marketplace may further store the secondary contact information 328 of the sender 312 in the sender's customer profile, and withhold or save any E-mails that were intended for the sender 312 during the duration 322 of her unavailability. Finally, the online marketplace may further acknowledge or store the information regarding the agent 330, and may review or suspend any orders for items that may be made on behalf of the sender 312 by persons other than the sender 312 or the agent 330, or for which delivery is requested to a destination other than the location where the sender 312 will be, the location of the agent 330, or the location referenced in the primary contact information 350.

Any information contained or inherent in the contents of an automated reply message may be augmented with other information that may be obtained from one or more extrinsic sources, in order to determine any additional information regarding the user who caused the automated reply message to be delivered. For example, where an out-of-office message received from a user by an online marketplace indicates that the user is on vacation, any data regarding the user's searches for or purchases of items may be analyzed to identify where the user went or what the user did while he or she was on vacation. If the user reviewed or purchased suntan lotion, beach towels and guidebooks regarding surf spots in Florida just prior to the marketplace's receipt of the out-of-office message, then it may be understood that the user vacationed in Florida, and may enjoy surfing. Conversely, the user reviewed or purchased models of skis and parkas, it may be understood that the user visited a cold weather location while on vacation, and may enjoy skiing or camping. Therefore, when taken in connection with other information, the contents of an automated reply message may further increase the information that may be known or identified regarding a user.

As is discussed above, the information included in an automated reply message may also be analyzed by a recipient thereof to determine whether there are any patterns of unavailability for the sender of the message that may be identified therein, or in combination with other automated reply messages received from the sender in the past. Such patterns may suggest when the sender is likely to be available or unavailable in the future, and may permit the recipient to offer pertinent services to the sender, such as the holding or forwarding any electronic messages, during such periods.

Figure 4:
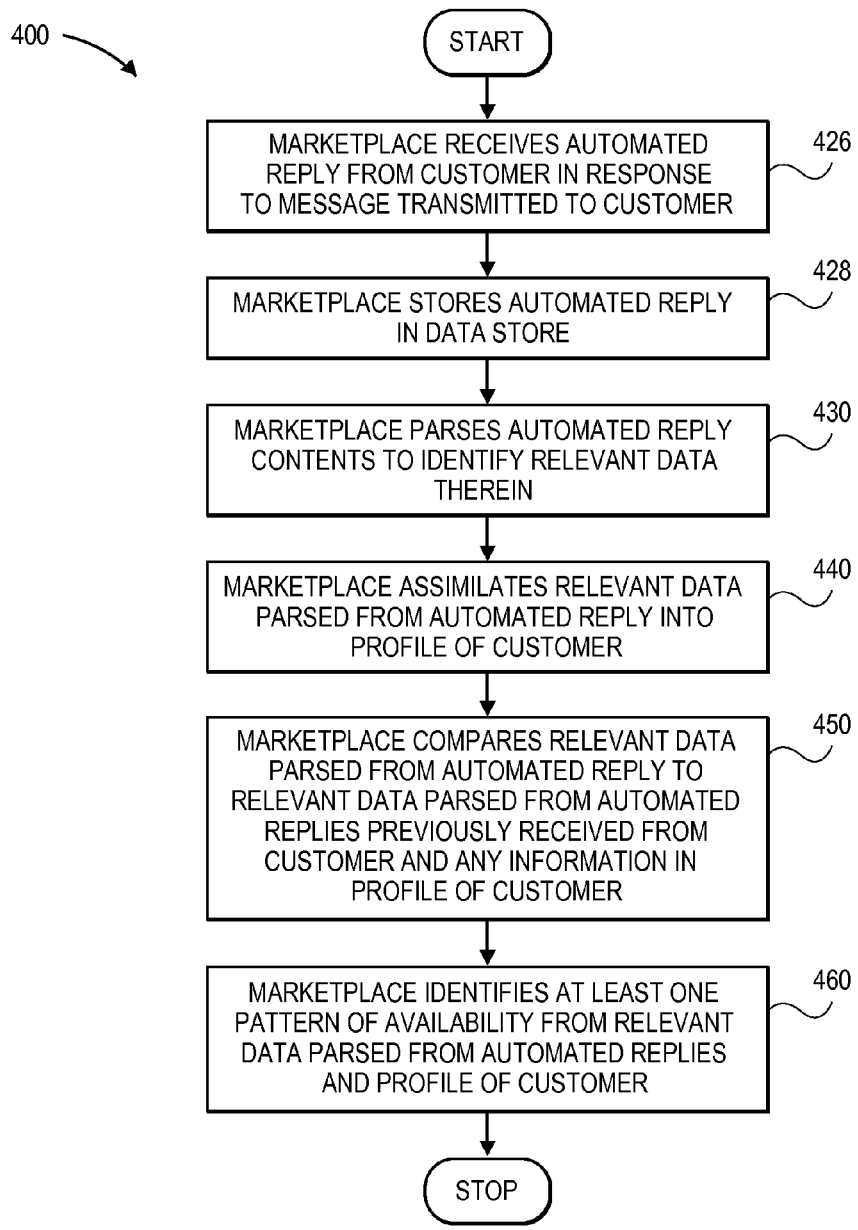
FIG. 4 is a flow chart of one example of a process for determining user information from automated replies, in accordance with embodiments of the present disclosure.

Referring to FIG. 4, a flow chart 400 representing one embodiment of a process for determining user information from automated replies is shown. Except where otherwise noted, process steps shown in the flow chart 400 of FIG. 4 with reference numerals beginning with "4" are similar to process steps shown in the flow chart 200 of FIG. 2 with reference numerals beginning with "2."

At step 426, the marketplace receives an automated reply from a customer in response to a message that was transmitted to the customer, and at step 428, the marketplace stores the automated reply in a data store. At step 430, the marketplace parses the contents of the automated reply, to identify any relevant data that may be contained therein, and at step 440, the marketplace assimilates the relevant data that was identified at step 430 into a profile for the customer. For example, if the automated reply includes new secondary contact information for the customer, identifies one or more agents who may act on the customer's behalf, or otherwise states any particular fact regarding the customer's unavailability, such information may be incorporated into the customer's profile, to either augment or replace any information that may already exist there.

At step 450, the marketplace compares the relevant data parsed from the automated reply to other relevant data that was parsed from automated replies that were previously received from the customer, and any information in the customer profile. For example, where a marketplace receives an out-of-office indicator from a customer indicating that he or she will be traveling to Wisconsin for a given week in the fall, the online marketplace may review any automated replies that it received from the customer in the past, as well as any other data in the customer profile, to determine whether any commonalities (e.g., whether the customer profile reflects any other trips to Wisconsin, any events of interest in the fall, or any prior interest in Wisconsin-related or fall-related topics such as cheese, bratwurst or the Green Bay Packers) exist between the previously received automated replies or the customer profile data.

At step 460, the marketplace identifies at least one pattern of availability for the customer from the relevant data parsed from the automated replies and the customer profile. For example, where the marketplace receives an automated reply indicative of a maternity leave by the customer, and the marketplace has previously received automated replies from the customer that are indicative of occasional visits to a doctor, and where the customer's profile demonstrates an interest in purchasing books, toys or clothing for an infant, it may be logically inferred that the customer, or someone of close relation to the customer, has recently had a child based on the automated replies and the information in the customer profile. Therefore, one pattern of availability that may be identified from the automated replies is an expected annual unavailability on or around the time of the maternity leave, and may make any steps accordingly.

Likewise, where the marketplace receives an out-of-office message from a New England-area customer every Saturday from October through April, and the customer's profile indicates an interest in purchasing running shoes or books on running diets, marathon training and trips to Boston, it may be logically inferred that the customer may be a fan of marathons in general, or may be running the Boston Marathon in particular. Therefore, another pattern of availability may be identified from the automated replies is an expected unavailability on the third Monday in April, when the Boston Marathon is annually held, and the marketplace may take any steps accordingly.

Figure 5A:
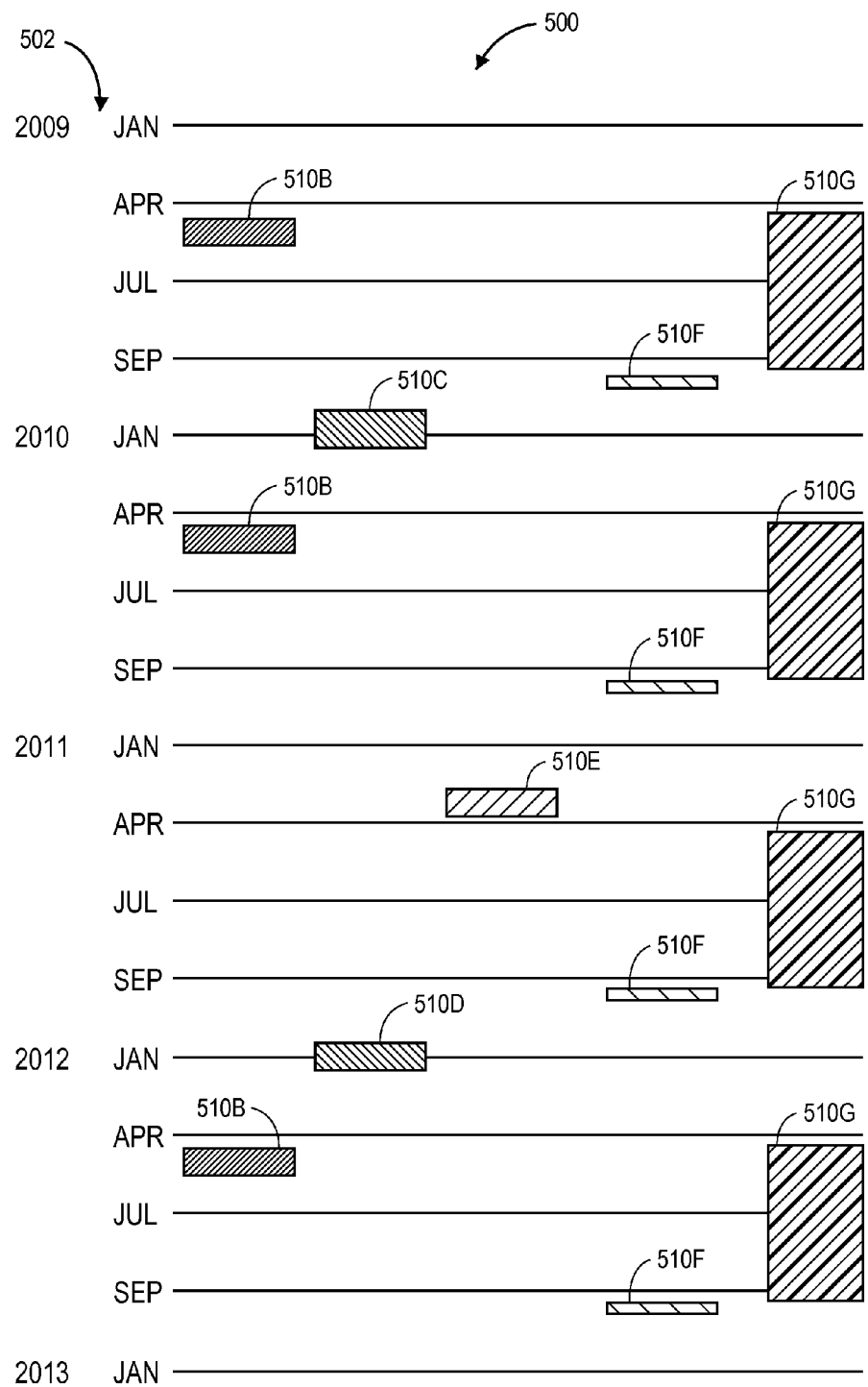
FIG. 5A is a timeline of automated replies created by or on behalf of a user and analyzed by systems and methods for determining user information from such automated replies, in accordance with embodiments of the present disclosure.

Any pattern regarding the availability or unavailability of a user, or of the user's interest in one or more items or categories of items, may be identified by information expressed in one or more automated reply messages, and further augmented by information that may already be known about the user (e.g., residing in a profile of a customer). Where the reply messages are received from a user on a regular basis or in a consistent nature, the recipient of the reply messages may interpret the contents and the frequency thereof and make any determinations about the interests of the user. Referring to FIG. 5A, a timeline 500A of patterns of automated reply messages 510B, 510C, 510D, 510E, 510F, 510G established by a user is shown.

The timeline 500A includes five patterns of automated reply messages during the period of January 2009 through January 2013. First, messages 510B were established by the user at common periods during the spring of 2009, the spring of 2010 and the spring of 2013. Second, message 510B was established by the user in December 2009 and January 2010, and message 510C was established by the user in a similar period during December 2011 and January 2012. Third, message 510D was established by the user during the late winter of 2011. Fourth, messages 510E were established by the user in common periods during the fall of 2009, the fall of 2010, the fall of 2011 and the fall of 2012. Finally, messages 510F were established between the months of May and September in 2009, 2010, 2011 and 2012.

Referring to FIGS. 5B-5G, the automated reply messages 510B, 510C, 510D, 510E, 510F, 510G established by the user and represented in the timeline 500A of FIG. 5A are shown. Except where otherwise noted, aspects of the messages 510B, 510C, 510D, 510E, 510F, 510G shown in FIGS. 5B-5G with reference numerals beginning with "5" are similar to aspects of the automated reply message 300 shown in FIG. 3 with reference numerals beginning with "3."

Referring to FIG. 5B, the message 510B identifies a sender 512B, a date 514B (viz., May 11), a recipient 516B and a subject 518B of the message 510B, and further includes a body 520B of the message 510B and information 530B regarding an authorized agent of the sender 512B. The body 520B of the message 510B identifies information 522B regarding a duration for which the sender 512B may be unavailable, information 524B regarding a reason or purpose for the unavailability (viz., "tanned, rested and ready"), information 526B regarding a location of the sender 512B during his unavailability (viz., the Cayman Islands) and information 528B regarding secondary contact information for the sender 512B. The message 510B further identifies an agent 532B and includes a telephone number 534B and an E-mail address 536B of the agent.

Therefore, the systems and methods of the present disclosure may infer that the sender 512B is interested in traveling to warm areas in the spring, based on the date 514B of the message 510B and the information 524B, 526B, and the repeated occurrences of the messages 510B as is shown in the timeline 500A of FIG. 5A, but also that the sender 512B may be contacted via telephone based on the information 528B, or through the agent 532B, during his unavailability.

Referring to FIGS. 5C and 5D, the messages 510C, 510D identify a sender 512C, 512D, dates 514C, 514D (i.e., late December), a recipient 516C, 516D and subjects 518C, 518D of the messages 510C, 510D. The messages 510C, 510D further include bodies 520C, 520D of the messages 510C, 510D and information 530C, 530D regarding an authorized agent of the sender 512C. The bodies 520C, 520D of the messages 510C, 510D identify information 522C, 522D regarding durations for which the sender 512C, 512D may be unavailable (i.e., through the first week of January), information 526C, 526D regarding locations of the sender 512C, 512D during his unavailability (viz., Stratton Mountain, Vt., and Vail, Colo.) and information 528C, 528D regarding secondary contact information (i.e., mobile telephone number).

Therefore, the systems and methods of the present disclosure may infer that the sender 512C, 512D is interested in traveling to cold areas over the winter holidays, based on the dates 514C, 514D of the messages 510C, 510D and the information 526C, 526D, and the common occurrences of the messages 510C, 510D as is shown in the timeline 500A of FIG. 5A. Additionally, while the messages 510C, 510D do not expressly identify a purpose or reason for the visits to cold areas, such systems and methods may further infer reasons or purposes for the visits based on information 526C, 526D regarding the locations of the sender 512C, 512D during his unavailability (viz., ski resorts in Vermont and Colorado).

Referring to FIG. 5E, the message 510E identifies a sender 512E, a date 514E (viz., March 7), a recipient 516E and a subject 518E of the message 510E, and further includes a body 520E of the message 510E. The body 520E of the message 510E identifies information 522E regarding a duration for which the sender 512E may be unavailable (viz., from March 7 through March 21) and information 524E regarding a reason or purpose for the unavailability (viz., paternity leave).

Therefore, the systems and methods of the present disclosure may infer that the sender 512E enjoyed the birth of a child during his period of unavailability, based on the information 524E. Although the message 510E was received from the sender 512E just once, such systems and methods may infer that the sender 512E will likely celebrate birthdays of the child in or around the period of unavailability, beginning the following year, and may target marketing efforts to the sender 512E accordingly in the future.

Referring to FIG. 5F, the message 510F identifies a sender 512F, a date 514F (viz., October 19), a recipient 516F and a subject 518F of the message 510F, and further includes a body 520F of the message 510F and information 530F regarding an authorized agent of the sender 512F. The body 520F of the message 510F identifies information 522F regarding a duration for which the sender 512F may be unavailable (viz., a remainder of the date 514F and until the following Monday) and information 524F regarding a reason or purpose for the unavailability (viz., celebrating an anniversary). The message 510F further identifies an agent 532F and includes a telephone number 534F and an E-mail address 536F of the agent.

Therefore, the systems and methods of the present disclosure may infer that the sender 512F celebrates his anniversary on or about the third week of October each year, based on the date 514F of the message 510F and the information 524F, and the repeated occurrences of the messages 510F as is shown in the timeline 500A of FIG. 5A, but also that the sender 512F may be contacted through the agent 532F during his unavailability.

Figure 5G:
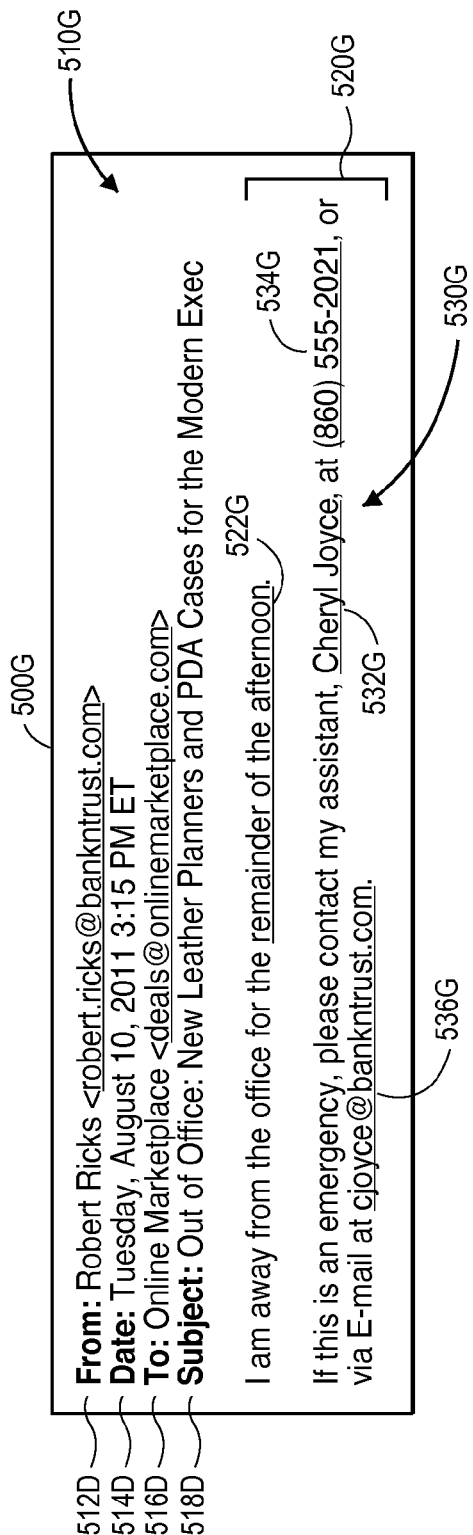

Finally, referring to FIG. 5G, the message 510G identifies a sender 512G, a date 514G (viz., August 10), a recipient 516G and a subject 518G of the message 510G, and further includes a body 520G of the message 510G and information 530G regarding an authorized agent of the sender 512G. The body 520G of the message 510G identifies information 522G regarding a duration for which the sender 512G may be unavailable (viz., a remainder of the date 514G). The message 510G further identifies an agent 532G and includes a telephone number 534G and an E-mail address 536G of the agent.

Therefore, the systems and methods of the present disclosure may infer that the sender 512G is out of the office for afternoons in general, or on Tuesday afternoons in particular, between May and October each year, based on the date 514G of the message 510G and also the repeated occurrences of the messages 510G as is shown in the timeline 500A of FIG. 5A. Such information may be further refined based on any data available in a profile of the sender 512G, which may reflect his or her interest in golf, tennis or some other seasonal activity.

Accordingly, the systems and methods of the present disclosure may identify any information associated with one or more automated reply messages received from a user, including the contents of such messages and/or the timing or frequency at which such messages are delivered, and utilize such information for any purpose. Particularly where such messages are delivered in accordance with a pattern or are associated with a specific event, an online marketplace operating one or more of the systems and methods disclosed herein may make a determination as to periods of a customer's future availability or unavailability, and anticipate any interests or demands (i.e., in one or more items or categories of items) that the customer may have before, during or after such periods.

As is discussed above, any secondary contact information or communications channels that may be identified in an automated reply message received from a user (such as the user's current or temporary locations, telephone numbers or electronic mail addresses) may be utilized to communicate with the user. For example, where a message includes information of an urgent nature for the user (such as information regarding a pending threat to public safety or a weather occurrence, or information of specific personal importance), the systems and methods disclosed herein may transmit some or all of the information of the urgent nature to the user via one or more designated secondary channels upon the receipt of an automated reply message, including a text message, an E-mail or a social networking message to a mobile telephone number, secondary E-mail address or social networking handle or account identified in the automated reply message.

Figure 6:
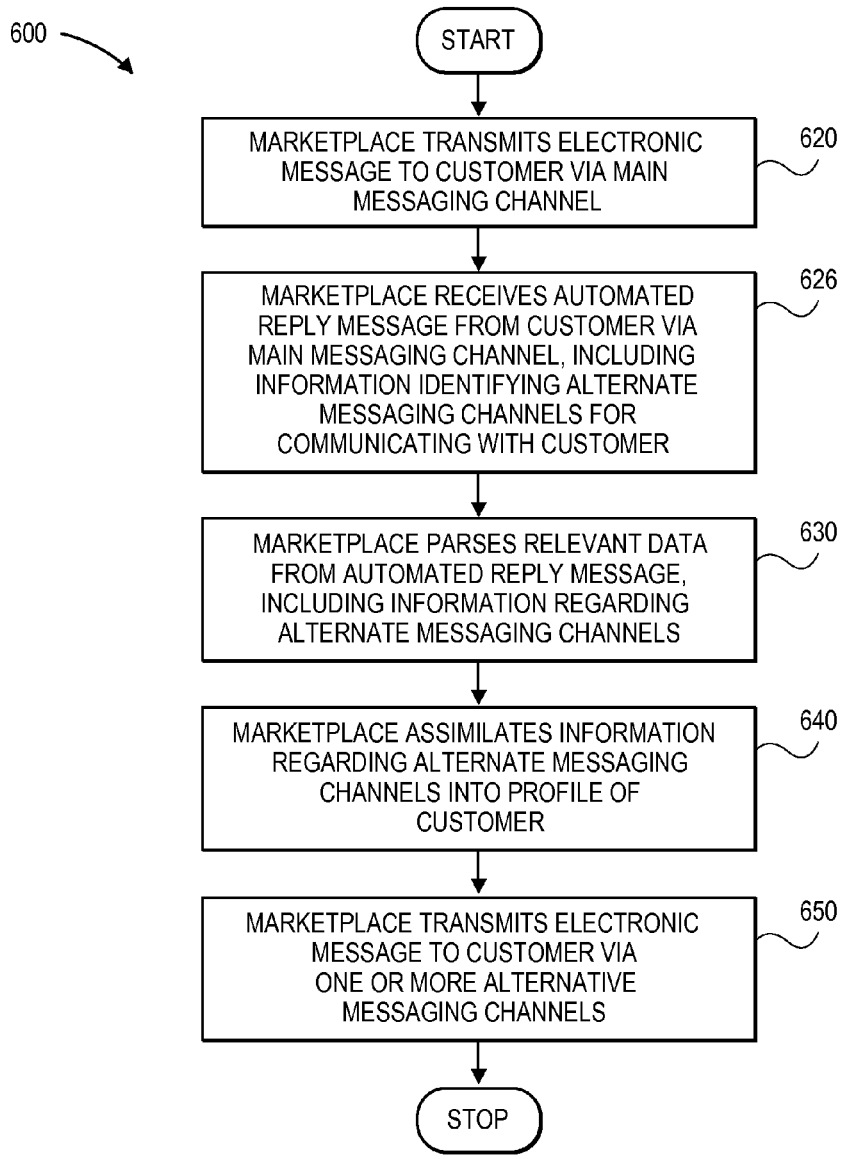
FIG. 6 is a flow chart of one example of a process for determining user information from automated replies, in accordance with embodiments of the present disclosure.

Referring to FIG. 6, a flow chart 600 representing one embodiment of a process for determining user information from automated replies is shown. Except where otherwise noted, process steps shown in the flow chart 600 of FIG. 6 with reference numerals beginning with "6" are similar to process steps shown in the flow chart 400 of FIG. 4 with reference numerals beginning with "4," or in the flow chart 200 of FIG. 2 with reference numerals beginning with "2."

At step 620, the marketplace transmits an electronic message to a customer via a main messaging channel. For example, the electronic message may be an E-mail sent to the customer's primary E-mail address. At step 626, the marketplace receives an automated reply message from the customer via the main message channel, such as an "out-of-office" message via reply E-mail, that identifies one or more alternate messaging channels for the customer, such as a secondary E-mail address, a mobile telephone number, a social networking handle (e.g., screen name or user name) or any other form or venue to which an alternative communication intended for the user may be delivered.

At step 630, the marketplace parses the contents of the automated reply, in order to identify any relevant data that may be contained therein, including the information regarding the alternate messaging channels for the customer. At step 640, the marketplace assimilates the information regarding the alternate messaging channels into a profile for the customer, i.e., to accompany information regarding the main messaging channel.

At step 650, the marketplace transmits an electronic message to the customer via one or more of the alternate messaging channels, and the process ends. For example, according to one embodiment, the electronic message may comprise one or more portions, or a condensed version, of the electronic message that was transmitted to the customer at step 620. Alternatively, according to another embodiment, the electronic message may comprise a hyperlink to an external site or a request to visit the main messaging channel to view the electronic message that was transmitted to the customer at step 620. According to yet another embodiment, the electronic message may comprise a request to confirm the validity of a purchase made on the customer's behalf during a period of unavailability for the customer.

As is also discussed above, the systems and methods of the present disclosure may identify information regarding a user that may be contained in or associated with one or more automated reply messages, and utilize such information to combat fraud against the user. For example, an online marketplace operating one or more of the systems and methods disclosed herein may identify a period of unavailability for a customer, as well as a location or other secondary contact information for the customer during such period, and an identity of one or more authorized agents who may act on his or her behalf when he or she is unavailable, as expressed in the content of an automated reply message. If the online marketplace receives an order for an item from a third party who is neither the customer nor his or her agent during a period when the customer is not available, or if the order specifies a destination for the item that is not associated with either the customer or his or her agent, then the online marketplace may cancel or suspend the order, and/or investigate the circumstances in which it was placed.

Figure 7:
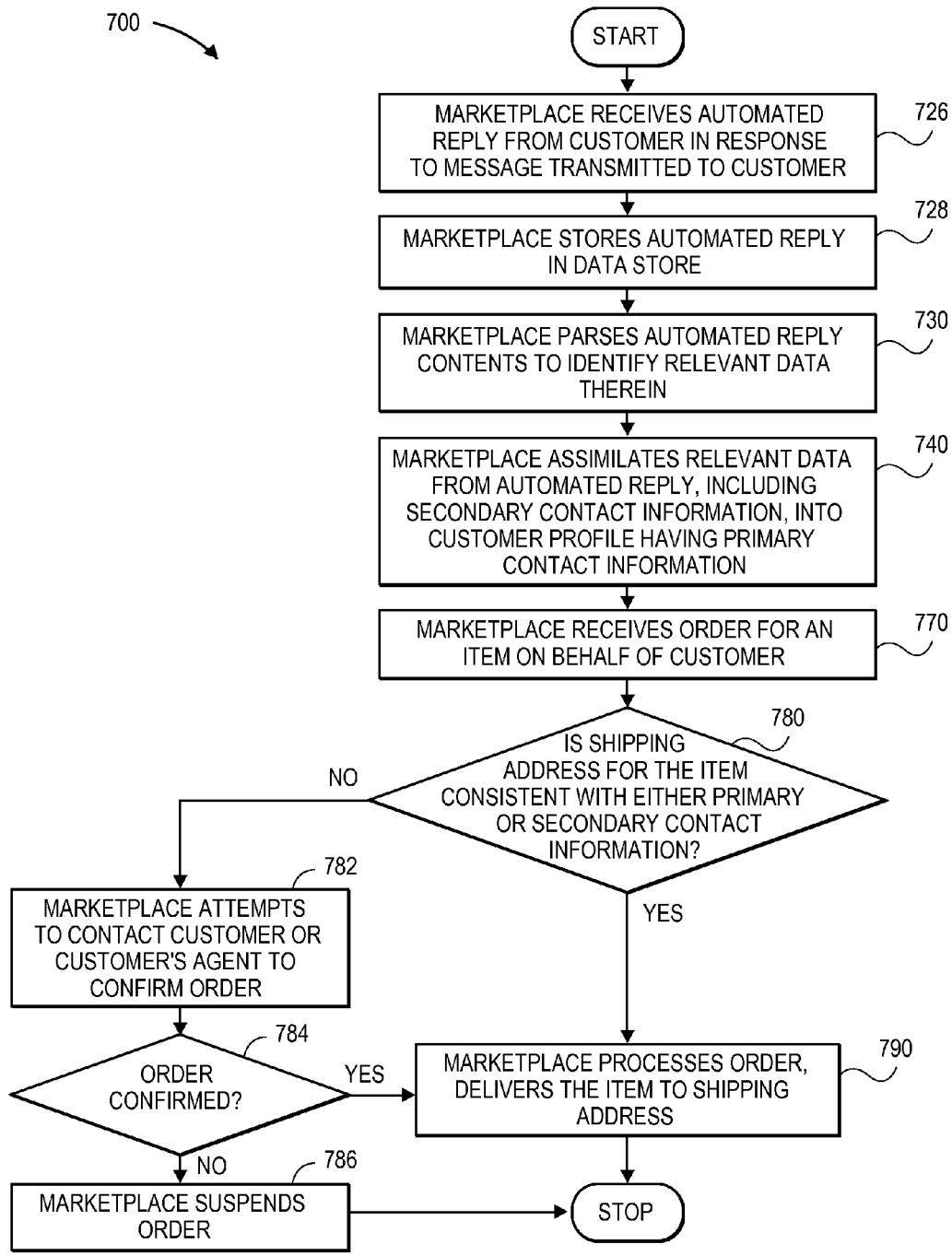
FIG. 7 is a flow chart of one example of a process for determining user information from automated replies, in accordance with embodiments of the present disclosure.

Referring to FIG. 7, a flow chart 700 representing one embodiment of a process for determining user information from automated replies is shown. Except where otherwise noted, process steps shown in the flow chart 700 of FIG. 7 with reference numerals beginning with "7" are similar to process steps shown in the flow chart 600 of FIG. 6 with reference numerals beginning with "6," the flow chart 400 of FIG. 4 with reference numerals beginning with "4," or in the flow chart 200 of FIG. 2 with reference numerals beginning with "2."

At step 726, the marketplace receives an automated reply from a customer in response to a message that was transmitted to the customer, and at step 728, the marketplace stores the automated reply in a data store. At step 730, the marketplace parses the contents of the automated reply, to identify any relevant data that may be contained therein, and at step 740, the marketplace assimilates the relevant data that was identified at step 730, including any secondary contact information, into a profile for the customer. For example, if the automated reply includes a secondary telephone number, electronic mail address or physical location where the customer may be reached, such information may be added to the customer profile.

At step 770, the marketplace receives an order for an item on behalf of the customer (e.g., by a person who entered the customer's user name or E-mail address and password at the online marketplace), including a shipping address for the item. At step 780, it is determined whether a shipping address for the item is consistent with either the primary contact information set forth in the customer profile or the secondary contact information identified in the automated reply. If the shipping address is consistent with either the primary or the secondary contact information (i.e., the item is to be delivered to the customer or to his or her agent), then the process advances to step 790, where the marketplace processes the order and delivers the item to the designated shipping address.

If the shipping address is not consistent with either the primary or the secondary contact information (i.e., the item is to be delivered to a location not affiliated with the customer or his or her agent), then the process advances to step 782, where the marketplace attempts to contact the customer or the customers agent to confirm the legitimacy of the order. If the order may be confirmed, then the marketplace processes the order and delivers the item to the designated shipping address at step 790. If the order may not be confirmed, then the marketplace suspends the order at step 786, and the process ends.

Accordingly, the systems and methods of the present disclosure may provide an additional layer of security for customers of online marketplaces who have established automated reply messages indicating their unavailability for any reason. Where an order calling for a delivery of an item to a location that is not associated with either the customer or his or her designated agent is received, and the order cannot be confirmed as legitimate, the order may be canceled, suspended and/or investigated by the online marketplace.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, the messages that may be analyzed by the systems and methods disclosed herein are not limited to "out-of-office" messages. Rather, any automated message received from a user, such as a message including a new telephone number, E-mail address or other contact information (e.g., a name change) for the user may be analyzed to identify any relevant data contained therein, and such data may be associated with the user. Moreover, patterns associated with automated reply messages may be identified based on messages received from more than one person. Furthermore, the use of information harvested from an automated reply message may be restricted on any selective basis. For example, where a secondary E-mail address for a user is identified from an automated reply message, the use of the secondary E-mail address may be limited to instances in which an E-mail of critical importance is sent to a primary E-mail address maintained by the user, i.e., if the E-mail is particularly critical, it may be forwarded to the secondary E-mail address, but if the E-mail is of a standard nature, then the E-mail may not be forwarded.

Additionally, where the systems and methods disclosed herein are employed to combat fraud, a secondary location of a customer may be identified based on the contents of an automated reply message, even if such contents do not expressly identify a town, a city, a state or a country where the customer is located. For example, if the contents of the automated reply message identify a building where the customer is located, the actual location of the building may be identified by extrinsic means. Furthermore, if the contents of the automated reply message associate a telephone number for a landline with a customer, an area code of the telephone number may also be utilized to determine the approximate location of the customer. For example, if the contents of the automated reply message include a landline telephone number having an area code of 407 (i.e., associated with central Florida), an order for a delivery of an item to an address in or around central Florida on behalf of the customer might be assumed to be legitimate, and orders for deliveries of items to areas outside central Florida may require further analysis.

Additionally, although many of the embodiments described above relate to the processing and interpretation of automated reply messages that are sent and received via electronic mail, the systems and methods disclosed herein are not so limited, and may be utilized to process and interpret other forms of electronic messages, including but not limited to SMS or MMS text messages, or social network postings or messages.

It should be understood that, unless otherwise explicitly or implicitly indicated herein, any of the features, characteristics, alternatives or modifications described regarding a particular embodiment herein may also be applied, used, or incorporated with any other embodiment described herein. Moreover, with respect to the one or more methods or processes of the present disclosure described herein, including but not limited to the flow charts shown in FIGS. 2, 4 and 6, the order in which the steps of the methods or processes are listed is not intended to be construed as a limitation on the claimed inventions, and any number of the method or process steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A non-transitory computer-readable medium having computer-executable instructions stored thereon,
   wherein the instructions, when executed, cause a computer having at least one computer processor to perform a method for determining information regarding a customer from an out-of-office reply message, the method comprising:
   identifying a customer profile stored in a data store using the at least one computer processor, the profile comprising a primary E-mail address, a primary telephone number and a primary delivery address of the customer;
   transmitting an original message to the primary E-mail address of the customer over a network;
   receiving the out-of-office reply message on behalf of the customer, the out-of-office reply message including the information regarding the customer over the network;
   parsing the information regarding the customer from the out-of-office reply message, using the at least one computer processor; and
   storing the information regarding the customer in the customer profile, using the at least one computer processor, wherein the information regarding the customer comprises at least one of a secondary E-mail address of the customer, a secondary telephone number of the customer, a secondary delivery address of the customer, or a date of availability of the customer;
   identifying a subsequent message scheduled to be transmitted to the customer over the network prior to the date of availability, using the at least one computer processor; and
   transmitting the subsequent message to the primary E-mail address of the customer over the network after the date of availability.

2. The non-transitory computer-readable medium of claim 1, wherein the method further comprises at least one of:
   transmitting the original message to the secondary E-mail address of the customer over the network prior to the date of availability; or
   transmitting at least some of the original message as an SMS text message or an MMS text message to the secondary telephone number of the customer prior to the date of availability.

3. The non-transitory computer-readable medium of claim 1, wherein the method further comprises:
   receiving an order for a purchase of an item on behalf of the customer over the network, wherein the order specifies a destination for the item;
   determining that the destination is one of the primary delivery address or the secondary delivery address; and
   causing a delivery of the item to the destination.

4. A computer-implemented method comprising:
   receiving a reply message from a user over a network, wherein the reply message comprises information associated with the user, and wherein the information associated with the user identifies at least one of an agent authorized to act on behalf of the user, a location of the agent, a telephone number of the agent, an E-mail address of the agent or a secondary location of the user;
   parsing the information associated with the user from the reply message using at least one computer processor;
   adding the information associated with the user to a profile of the user in at least one data store;
   receiving an order for at least one item on behalf of the user over the network, wherein the order specifies a destination for the item;
   determining whether the destination is one of the location of the agent, the secondary location of the user, or a primary location listed in the profile of the user; and
   in response to determining that the destination is one of the location of the agent, the secondary location of the user, or the primary location listed in the profile of the user, causing a delivery of the at least one item to the destination,
   wherein the reply message is automatically transmitted on behalf of the user in response to a receipt of an origination message sent to the user.

5. The computer-implemented method of claim 4, wherein the information associated with the user further identifies at least one of a reply date of the reply message or an available date of the user, and
   wherein the method further comprises:
   determining a duration of an unavailability of the user based at least in part on at least one of the reply date or the available date.

6. The computer-implemented method of claim 5, wherein the origination message was sent to a primary E-mail address of the user, and
   wherein the information associated with the user further includes at least one of:
   a secondary E-mail address associated with the user during at least the duration of the unavailability;

a secondary telephone number of the user associated with the user during at least the duration of the unavailability;

a social network screen name associated with the user during at least the duration of the unavailability; or a location of the user during at least the duration of the unavailability.

7. The computer-implemented method of claim 5, further comprising:

canceling a scheduled transmission of a subsequent message to a primary E-mail address of the user, wherein the subsequent message was scheduled to be transmitted during the duration of the unavailability.

8. The computer-implemented method of claim 7, further comprising:

transmitting the subsequent message to the user after the duration of the unavailability has lapsed.

9. The computer-implemented method of claim 7, wherein the information associated with the user further comprises a secondary E-mail address associated with the user during at least the duration of the unavailability, and wherein the method further comprises:

transmitting the subsequent message to the secondary E-mail address of the user over the network.

10. The computer-implemented method of claim 5, further comprising:

determining a reason for the unavailability based at least in part on the information associated with the user, wherein the information associated with the user further comprises at least one of a date of an unavailability of the user or a plurality of keywords associated with the user.

11. The computer-implemented method of claim 5, wherein the information associated with the user further comprises a reason for the unavailability, and wherein the method further comprises:

identifying an earlier reply message received from the user stored in the data store using the at least one computer processor, wherein the earlier reply message comprises at least one of an earlier reply date, an earlier available date of the user, a duration of an earlier unavailability of the user, or a reason for the earlier unavailability of the user; and determining a pattern of unavailability based at least in part on the reply message and the earlier reply message, using the at least one computer processor.

12. The computer-implemented method of claim 11, wherein determining the pattern of unavailability based at least in part on the reply message and the earlier reply message comprises:

comparing at least one of the reply date, the available date, the duration of the unavailability, or the reason for the unavailability to at least one of the earlier reply date, the earlier available date, the duration of the earlier unavailability, or the reason for the earlier unavailability; and determining the pattern of unavailability based on the comparison of the at least one of the reply date, the available date, the duration of the unavailability, or the reason for the unavailability to the at least one of the earlier reply date, the earlier available date, the duration of the earlier unavailability, or the reason for the earlier unavailability.

13. The computer-implemented method of claim 5, wherein the information associated with the user further comprises a reason for the unavailability, and wherein the method further comprises:

identifying a plurality of earlier reply messages received from other users stored in the data store using the at least one computer processor, wherein each of the earlier reply messages comprises at least one of an earlier reply date, an earlier available date of another user, a duration of an earlier unavailability of the other user, or a reason for the earlier unavailability of the other user; and determining a pattern of unavailability for users based on the reply message and the earlier reply messages, using the at least one computer processor.

14. The computer-implemented method of claim 13, wherein identifying the pattern of unavailability for users based on the reply message and the earlier reply messages comprises:

comparing at least one of the reply date, the available date, the duration of the unavailability, or the reason for the unavailability to at least one of the earlier reply date, the earlier available date, the duration of the earlier unavailability, or the reasons for the earlier unavailability; and determining the pattern of unavailability based on the comparison.

15. The computer-implemented method of claim 5, wherein causing the delivery of the at least one item to the destination further comprises:

scheduling the delivery of the item to the destination for at least one of a first date or a first time after the duration of the unavailability, using the at least one computer processor.

16. The computer-implemented method of claim 5, further comprising:

transmitting a subsequent message to the user over the network, wherein the subsequent message is transmitted to the user during the duration of the unavailability;

determining whether a reply message is received from the user in response to the subsequent message, using the at least one computer processor; and in response to determining that the reply message is not received from the user in response to the subsequent message, determining that the user is available using the at least one computer processor.

17. The computer-implemented method of claim 16, wherein the origination message is transmitted from a first account of a common mail server, and wherein the subsequent message is transmitted from a second account of the common mail server.

18. The computer-implemented method of claim 6, further comprising:

transmitting, after receiving the reply message from the user, a subsequent message to the user over the network, wherein the subsequent message is one of:

an electronic mail message transmitted to the secondary E-mail address;

an SMS text message or an MMS text message transmitted to the secondary telephone number; or a message on a social network transmitted to the social network screen name associated with the user.

19. The computer-implemented method of claim 18, wherein the subsequent message comprises at least a portion of the origination message.

20. A computer system comprising at least one computer processor and at least one data store, wherein the computer system is adapted to execute a computer program causing the computer system to perform a method comprising:

receiving an automated reply message on behalf of the customer over a network, wherein the automated reply message comprises information regarding an unavailability of the customer, and wherein the information regarding the unavailability of the customer comprises a duration of the unavailability of the customer, secondary contact information for the customer during the unavailability of the customer, and an indication of an agent authorized to act on behalf of the customer during the unavailability of the customer;

receiving an order for at least one item over the network, wherein the order specifies a destination for the at least one item;

determining whether the order for the at least one item is authorized by the customer based at least in part on the information regarding the unavailability of the customer, using the at least one computer processor;

in response to determining that the order for the at least one item is authorized by the customer based at least in part on the information regarding the unavailability of the customer, processing the order for the at least one item, using the at least one computer processor; and causing a delivery of the at least one item to the destination specified in the order.

21. The computer system of claim 20, wherein determining whether the order for the at least one item is authorized by the customer comprises:

determining a location of the agent during the duration of unavailability of the customer, using the at least one computer processor;

identifying primary contact information for the customer stored in a customer profile, using the at least one computer processor; and determining whether the destination is consistent with at least one of the location of the agent, the primary contact information or the secondary contact information.

22. The computer system of claim 20, wherein the automated reply message comprises at least one of:

a secondary E-mail address at which the customer may receive messages during the unavailability;

a secondary telephone number of the customer at which the customer may receive telephone calls during the unavailability; or a social network screen name associated with the customer, and wherein determining whether the order for the at least one item is authorized by the customer based at least in part on the information regarding the unavailability of the customer comprises:

transmitting a message requesting a confirmation of the order to the customer, wherein the message requesting the confirmation of the order is one of:

an E-mail message transmitted to the secondary E-mail address;

an SMS text message or an MMS text message transmitted to the secondary telephone number; or a social network message sent to the social network screen name associated with the customer.

23. The computer system of claim 20, wherein causing the delivery of the at least one item to the destination specified in the order comprises:

scheduling the delivery of the at least one item for a date following the unavailability.

24. The computer system of claim 20, wherein the method further comprises:

in response to determining that the order for the at least one item is not authorized by the customer based at least in part on the information regarding the unavailability of the customer, canceling the order using the at least one computer processor.

25. The non-transitory computer-readable medium of claim 1, wherein the method further comprises:

determining that the destination is not one of the primary delivery address or the secondary delivery address; and canceling the order for the purchase of the item.

26. The computer-implemented method of claim 4, wherein the method further comprises:

in response to determining that the destination is not one of the location of the agent, the secondary location of the user, or the primary location listed in the profile of the user, canceling the order for the at least one item.

\* \* \* \* \*